United States Patent
Bhowmik

(10) Patent No.: US 6,836,604 B2
(45) Date of Patent: Dec. 28, 2004

(54) PASSIVE OPTICAL CHANNEL EQUALIZER APPARATUS, METHODS AND SYSTEMS

(75) Inventor: Achintya K. Bhowmik, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 10/184,591

(22) Filed: Jun. 27, 2002

(65) Prior Publication Data

US 2004/0001680 A1 Jan. 1, 2004

(51) Int. Cl.$^7$ ................................................. G02B 6/00
(52) U.S. Cl. ............................. 385/122; 385/14; 385/27
(58) Field of Search ........................... 385/17, 122, 14, 385/15, 27, 39, 40–42; 252/582

(56) References Cited

U.S. PATENT DOCUMENTS

| | | | |
|---|---|---|---|
| 4,787,714 A | 11/1988 | Greene et al. | 350/354 |
| 4,871,235 A * | 10/1989 | Greene et al. | 359/241 |
| 5,933,270 A | 8/1999 | Toyohara | 359/341 |
| 5,953,467 A * | 9/1999 | Madsen | 385/15 |
| 6,348,992 B1 * | 2/2002 | Zhang et al. | 359/321 |
| 2002/0181867 A1 * | 12/2002 | Chan et al. | 385/37 |

OTHER PUBLICATIONS

Bhowmik, Achintya K., et al., "Second–Harmonic Generation in Single–crystal Thin Films of 4–aminobenzophenone", *Journal of Applied Physics*; vol. 86, No. 2, (Apr. 6, 1999), 923–929.

Bhowmik, Achintya K., et al., "Self–Phase Modulation in Polydiacetylene Single Crystal Measured at 720–1064 nm", *Optics Letters*/ vol. 26, No. 12/ Jun. 15, 2001, (Dec. 6, 2000), 902–904.

Inoue, K., et al., "Tunable Gain Equalization Using a Mach–Zehnder Optical Filter in Multistage Fiber Amplifiers", *IEEE Photonics Technology Letters, 3* No. 8, (1991), 718–720.

Kubodera, Ken'ichi, "Measurements of Third–Order Nonliner Optical Efficiencies", *Nonlinear Optics, 1991*, vol. 1, Pp.71–80, (1991), 71–80.

Nalwa, Haris., et al., "Nonlinear Optics of Organic Molecules and Polymers", 581–585.

* cited by examiner

Primary Examiner—Hemang Sanghavi
Assistant Examiner—Scott A Knauss
(74) Attorney, Agent, or Firm—Schwegman, Lundberg, Woessner & Kluth, P.A.

(57) ABSTRACT

Passive optical channel equalizer apparatus includes first and second waveguides arranged to form a Mach-Zehnder interferometer. A non-linear optical medium section is formed in one of the waveguides and is capable of self-phase modulating each channel of an N-channel multiplexed lightwave to produce an output lightwave having improved channel power uniformity.

28 Claims, 4 Drawing Sheets

US 6,836,604 B2

PASSIVE OPTICAL CHANNEL EQUALIZER APPARATUS, METHODS AND SYSTEMS

TECHNICAL FIELD

The field of the invention relates to optical channel equalizers such as those used in optical networks.

BACKGROUND INFORMATION

First-generation optical networks employed a single-channel, in which an optical signal was carried by a single wavelength of light. The next-generation optical networks employed two channels, in which two optical signals were carried by two different wavelengths of light. Presently, optical networks employ multiple or N channels, in which N optical signals are carried by N different wavelength of light.

The N different wavelengths of light for the N channels are typically generated by N different laser sources (e.g., distributed feedback or "DFB" lasers) at different physical locations in the network. Each channel is individually modulated to create the optical signal for the channel. The N different channels are then multiplexed with an N-channel wavelength division multiplexer to send the channels over a single optical fiber, e.g., for long-haul optical communications.

The nature of N-channel optical networks is such that the power carried by the different channels naturally becomes increasingly non-uniform. There are three main factors that contribute to channel power non-uniformity. The first is light source non-uniformity, wherein the N different light sources associated with the N different channels have slightly different power outputs even if they are otherwise identical. Variable optical attenuators (VOAs) are typically used to uniformize the output powers of the different light sources.

The second factor contributing to channel power non-uniformity is called "wavelength-dependent attenuation," wherein each channel (i.e., wavelength) is attenuated to a different degree when traveling over the optical network.

The third factor is called "wavelength-dependent amplification," wherein each channel is amplified to a different degree when the signals pass through the optical amplifiers in the network.

In an N channel optical network, the channel power non-uniformity must be controlled to within a certain tolerance (e.g., within a few percent), or the network performance will suffer. This is because at one or more points in the optical network, the N channels are demultiplexed and fed to N different detectors. Each detector is designed to detect optical power between a maximum power $P_{MAX}$ and a minimum power $P_{MIN}$. If the power in the channel exceeds $P_{MAX}$, the detector saturates and cannot detect the bits in the optical signal. Likewise, if the power in the channel is below $P_{MIN}$, the detector is not sensitive enough to detect the bits in the optical signal. The failure to detect bits present in an optical signal leads to an increase in the bit-error rate (BER) and thus diminished network performance.

Because the channel power must be within a select tolerance, the channel power non-uniformities must be compensated, i.e., the channel power must be "equalized." To this end, N channel optical networks typically include one or more channel equalizers in the form of dynamic gain equalization filters (DGEFs) that equalize the channel powers. Each DGEF includes optical taps and detectors that tap and detect a small amount (e.g., 1%) of power from each channel of a demultiplexed signal to measure the power in each channel. Each channel is then passed through a corresponding VOA, which selectively attenuates the channel power in proportion to the measured power. The power-equalized channels are then re-multiplexed, and they continue their journey over the network.

While effective, this dynamic approach to channel equalization is complex and expensive because it requires VOAs and DGEFs. Future N channel optical networks would benefit from less complex and less expensive channel equalization devices and methods.

DETAILED DESCRIPTION

In the following detailed description of the embodiments of the invention, reference is made to the accompanying drawings that form a part hereof, and in which is shown by way of illustration specific embodiments in which the invention may be practiced. These embodiments are described in sufficient detail to enable those skilled in the art to practice them, and it is to be understood that other embodiments may be utilized and that changes may be made without departing from their scope. The following detailed description is, therefore, not to be taken in a limiting sense, and the scope of the present invention is defined only by the appended claims.

Figure 1:
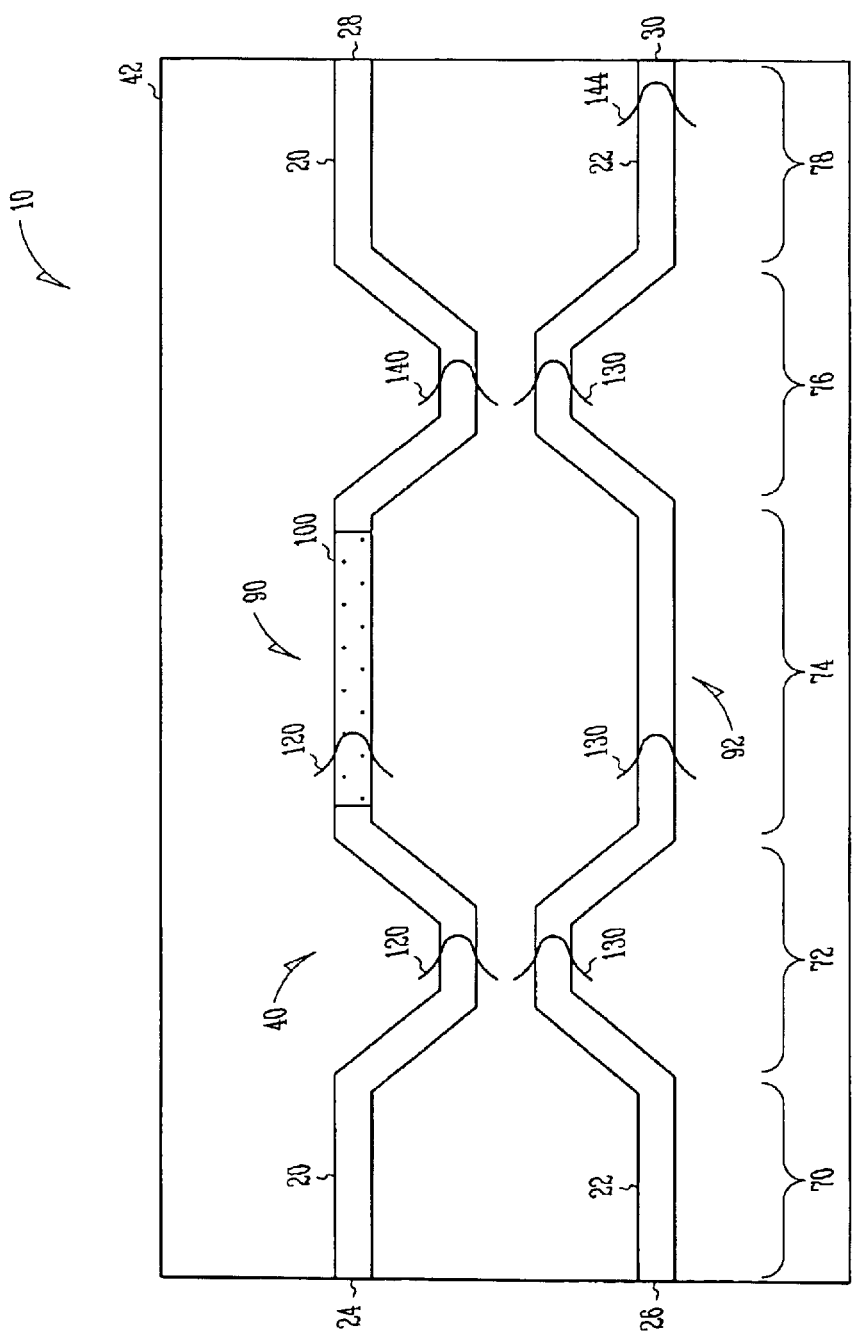
FIG. 1 is plan view of an example embodiment of a passive optical channel equalizer (POCE) apparatus.

FIG. 1 is a plan view of an example embodiment of a passive optical channel equalizer (POCE) apparatus 10. POCE 10 includes spaced apart waveguides 20 and 22 having respective input ends ("ports") 24 and 26 and respective output ends ("ports") 28 and 30. Waveguides 20 and 22 are arranged to form a Mach-Zehnder interferometer (MZI) 40. In an example embodiment, waveguides 20 and 22 are formed on a substrate 42, as illustrated in FIG. 1. In another example embodiment, waveguides 20 and 22 are optical fibers. In example embodiments, substrate 42 is made of an inorganic substance, such as gallium arsenide (GaAs) or other III-V semiconductors, or guest-host systems such as glass doped with non-linear active molecules.

MZI 40 includes an input section 70, a first coupling section 72, a central section 74, a second coupling section 76, and an output section 78. In the first and second coupling sections, waveguides 20 and 22 are spaced close enough together to allow for evanescent coupling between the waveguides. In an example embodiment, each coupling section is designed to provide 3 dB (decibel) coupling.

The section of waveguides 20 and 22 in central section 74 constitute respective arms 90 and 92 of MZI 40. The output state of the MZI (i.e., the relative amounts of optical power exiting output ports 28 and 30) is a sinusoidal function of the phase difference $\Delta\Phi$ between arms 90 and 92.

In a "balanced state" MZI (also called the "cross-state"), when $\Delta\Phi=0$ all of the inputted optical power $P_0$ inputted to waveguide 20 at input port 24 is outputted at output port 30 of waveguide 22. When $\Delta\Phi=\pi$, all of the inputted power is outputted at output port 28 of waveguide 20.

In an "unbalanced state" MZI (also called the "bar state"), when $\Delta\Phi=0$ all of the inputted optical power inputted to waveguide 20 at input port 24 is outputted at output port 28 of waveguide 20. When $\Delta\Phi=\pi$, all of the inputted power is outputted at output port 30 of waveguide 22.

In one example embodiment, MZI 40 operates in the balanced state. In another example embodiment, MZI 40 operates in the unbalanced state.

MZI 40 includes in one of the arms (say, arm 90 as shown in FIG. 1) a section 100 of waveguide 20 that includes a highly non-linear optical (NLO) material. A NLO material has a refractive index that changes with the intensity I of light incident thereon. Section 100 of NLO material is referred to hereinafter as "NLO section 100."

In an example embodiment, the NLO material includes a polymer, and further in the example embodiment the NLO material includes an organic polymer. Additionally in the example embodiment, the NLO material is polydiacetylene-para-toluene-sulfonate (PDA-PTS), which has a highly non-linear refractive index due to a one-dimensional confinement of the delocalized $\pi$-electrons in the polymer chain. The non-linear refractive index $n_2$ of PDA-PTS has been measured to be $\sim 10^{-5}$ square centimeters per megawatt (cm$^2$/MW) which is five orders of magnitude larger than that of silica.

In other example embodiments, the NLO material includes at least one of polydiacetylene 4-butylcarboxymethylurethane (PDA-BCMU), polythiophene, polycarbonate, polyphenylene vinylene, polypyrrole, or other non-linear optical polymers.

In the operation of MZI 40 in the balanced state, a multiplexed lightwave 120 made up of N channel lightwaves ("N-channels") is inputted into waveguide 20 at input port 24. The N channels each have respective optical powers $P_N$ and thus respective optical intensities $I_N$.

Figure 2:
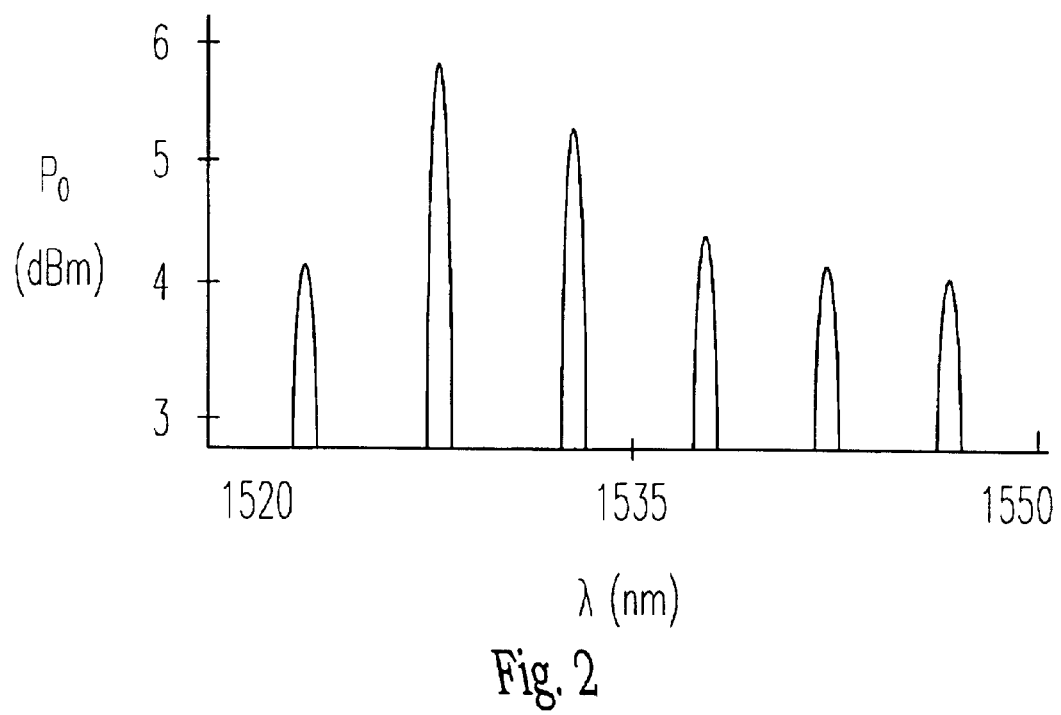
FIG. 2 is a plot of an example channel power spectrum for a multiplexed lightwave, wherein the vertical axis is the input power $P_0$ in dBm (dBm=10 log P in milliwatts) and the horizontal axis is the wavelength $\lambda$ in nm.

FIG. 2 is a plot of an example channel power spectrum for multiplexed lightwave 120. The vertical axis is the input power $P_0$ in dBm (dBm=10 log P, where P is the power in milliwatts), while the horizontal axis is the wavelength $\lambda$ in nm. The channel power spectrum of FIG. 2 represents a typical 6-channel WDM non-uniform spectrum exiting a C-band erbium-doped optical amplifier.

Lightwave 120 passes through first coupling section 72, which is designed to couple a portion (e.g., half, in the case of a 3 dB coupler) of the optical power $P_0$ inputted into waveguide 22. The result is the formation of a second multiplexed lightwave 130 traveling in waveguide 22. The remaining portion of lightwave 120 enters central section 74 and encounters NLO section 100 of arm 90.

NLO section 100 imparts a phase difference $\Delta\Phi_N$ to the Nth channel in lightwave 120 relative to lightwave 130. The phase difference $\Delta\Phi_N$ is given by:

$$\Delta\Phi_N = [2\pi/\lambda_N](n_2 I_N L) \quad \text{(Eq. 1)}$$

wherein $\lambda_N$ is the wavelength of the Nth channel, $n_2$ is the non-linear refractive index of the NLO material in NLO section 100, $I_N$ is the optical intensity (e.g., mW/cm$^2$) of channel N, and L is the length of NLO section 100.

The presence of NLO section 100 thus leads to self-phase modulation of the different channels in lightwave 120 by virtue of the different intensities $I_N$ associated with each channel. The result is a phase-altered lightwave 140, which proceeds to second coupling section 76 and interferes with lightwave 130 traveling in waveguide 22. In an example embodiment, the result is an N-channel lightwave 144 that is outputted from output port 30.

The total amount of power $P_{TN}$ outputted from output port 30 for each channel is a function of the phase $\Delta\Phi_N$. This output can be expressed as an optical transmission function $T_N$ for a given channel N as:

$$T_N = P_{TN}/P_{ON} = \tfrac{1}{2}(1 + \cos \Delta\Phi_N) \quad \text{(Eq. 2)}$$

wherein $P_{ON}$ is the optical power for channel N inputted to waveguide 20 and $P_{TN}$.

Figure 3:
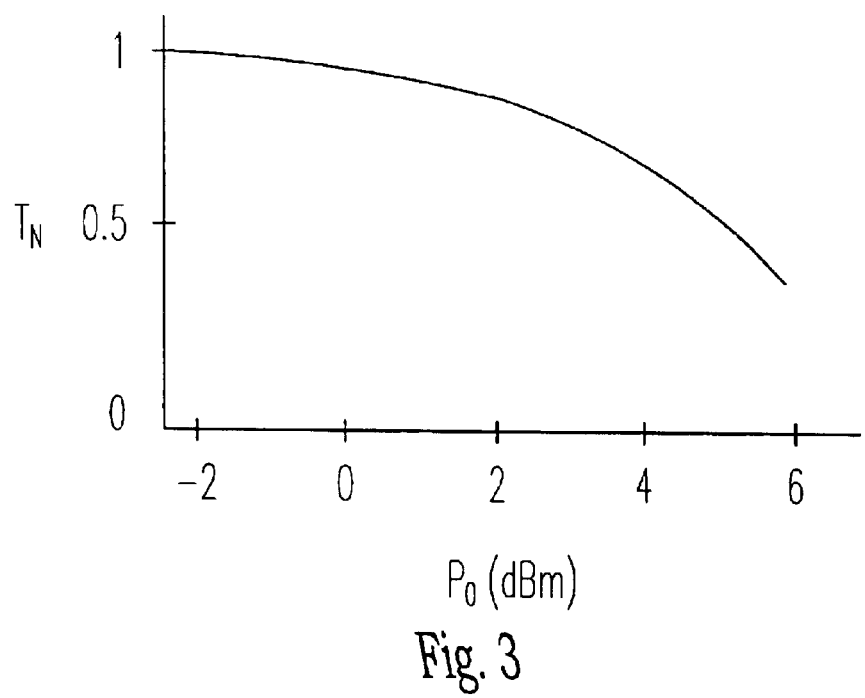
FIG. 3 is a plot of an example transmission function $T_N$ of the POCE apparatus of FIG. 1 as a function of optical power $P_0$ in dBm wherein the non-linear optical (NLO) medium is PDA-PTS.

FIG. 3 is a plot of an example transmission function $T_N$ of the POCE apparatus of FIG. 1 as a function of optical power $P_0$ (in dBm), wherein the NLO medium is PDA-PTS. The plot in FIG. 3 indicates that the phase difference $\Delta\Phi_N$ arising from the self-phase modulation of each channel leads to a power-dependent transmission at output port 30, with a higher power (or intensity) leading to a greater attentuation. This power-dependent transmission results in a "uniformized" (i.e., more uniform) power spectrum for the N channels as compared to the inputted channel power spectrum.

Figure 4:
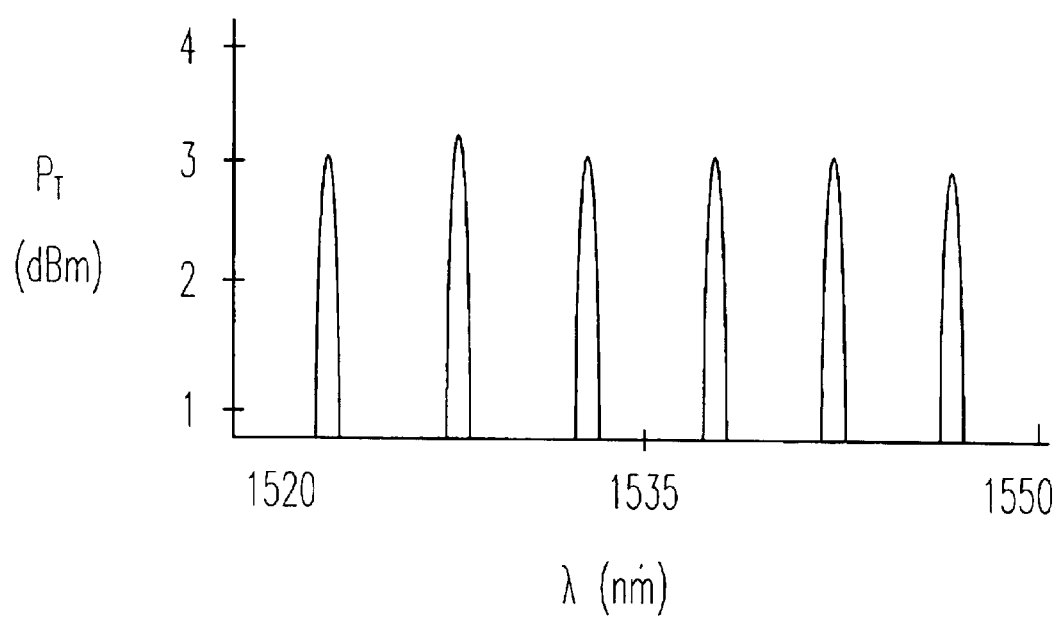
FIG. 4 is the same plot as FIG. 2, except that the vertical axis is the output power $P_T$ and the channel power spectrum has been equalized by passing the multiplexed lightwave through an example embodiment of apparatus of FIG. 1 having the example transfer function of FIG. 3.

FIG. 4 is the same plot as FIG. 2, except that the vertical axis is the output power $P_T$ and the channel power spectrum has been equalized by passing the multiplexed lightwave 120 through an example embodiment of apparatus of FIG. 1 having the example transfer function of FIG. 3. FIG. 4 plots the output power $P_T$ after lightwave 120 has passed through MZI 40, with the latter having a transmission function $T_N$ defined by Equation 2. As is seen from FIG. 4, the outputted channel power spectrum shown therein is more uniform than the inputted channel power spectrum of FIG. 2.

The analysis for an unbalanced MZI parallels that for the balanced MZI set forth above.

An advantage of POCE 10 is that NLO section 100 has an ultra-fast response, i.e., on the order of femtoseconds. Another advantage is that the multichannel lightwave does not need to be demultiplexed in order to perform channel power equalization. A further advantage is that POCE 10 is a simple passive device that does not require electrical power input for operation.

Figure 5:
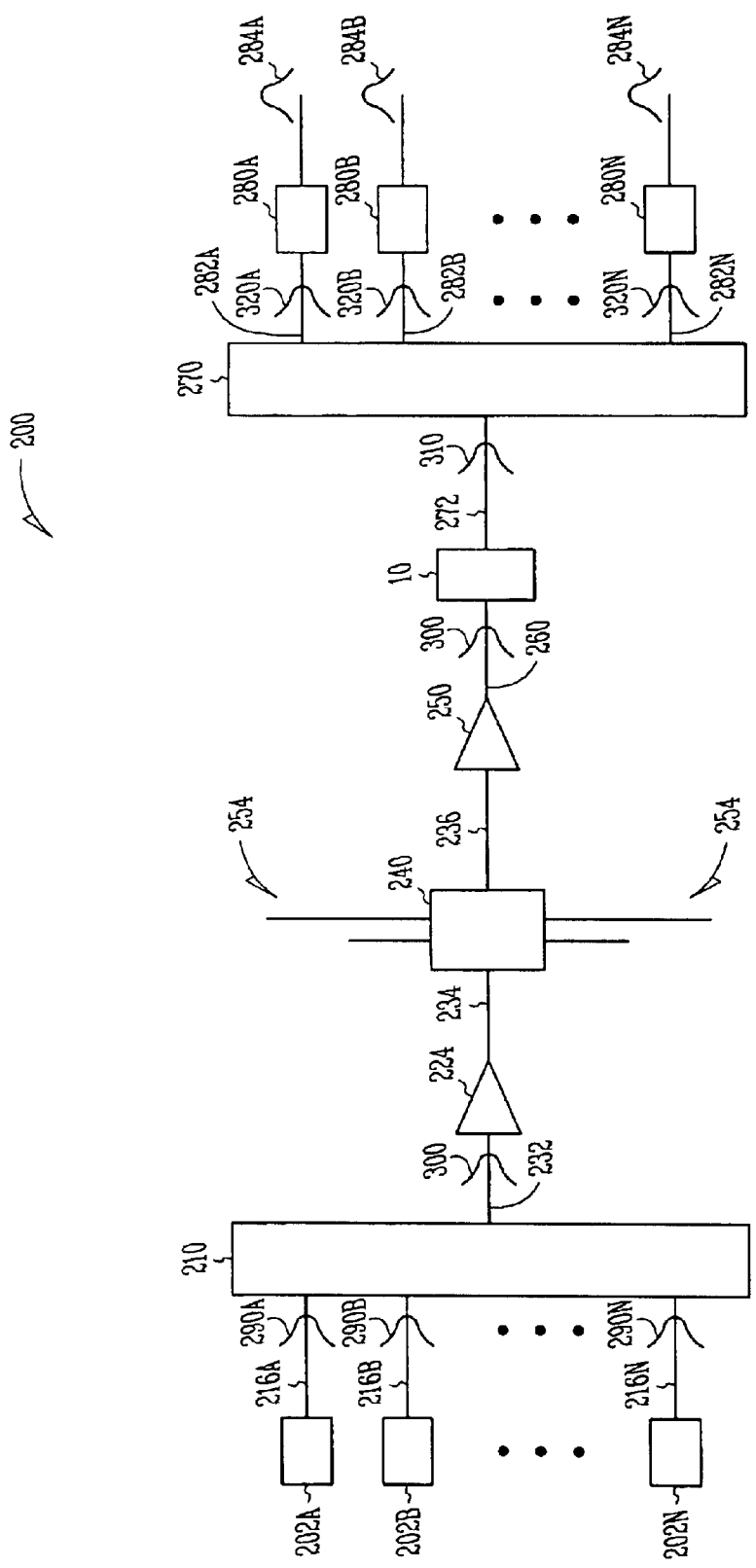
FIG. 5 is a schematic diagram of an example embodiment of an N-channel optical network that includes the passive optical channel equalizer apparatus of FIG. 1.

FIG. 5 is a schematic diagram of an example embodiment of an N-channel optical network 200 that includes the passive optical channel equalizer apparatus of FIG. 1. Network 200 includes N light sources 202A, 202B, . . . 202N optically coupled to a multiplexer 210 via N optical fibers 216A, 216B, . . . 216N. Light sources 202A, 202B, . . . 202N may be, for example, diode lasers each designed to emit light at a different wavelength. A first optical amplifier 224 is optically coupled to multiplexer 210 via an optical fiber 232. An optical switch or cross-connect 240 is optically coupled to amplifier 224 via an optical fiber 234 and to a second optical amplifier 250 optically downstream from the optical switch/cross-connect. Optical switch/cross-connect 240 is coupled to optical fibers 254 that carry lightwaves from a different part of the network.

A POCE such as POCE 10 is optically coupled to second amplifier 250 via an optical fiber 260 and is also optically coupled to a demultiplexer 270 via optical fiber 272. The demultiplexer is optically coupled to N detectors 280A, 280B, . . . 280N via N optical fibers 282A, 282B, . . . 282N. In an example embodiment, first and second optical amplifiers are fiber amplifiers, such as erbium-doped fiber amplifiers. Further in an example embodiment, N detectors 280A, 280B, . . . 280N are PIN (p-type/intrinsic/n-type) photodetectors.

In an example embodiment, network 200 operates as follows. Light sources 202A, 202B, . . . 202N emit N different lightwaves 290A, 290B, . . . 290N at N different wavelengths corresponding to N different channels. The N different lightwaves travel over optical fibers 216A, 216B, . . . . 216N and are combined by multiplexer 210 to form a multiplexed lightwave 300. Lightwave 300 then travels over optical fiber 232 to first optical amplifier 224, which amplifies each of the channels in lightwave 300. The amplified lightwave 300 then travels over optical fiber 234 to optical switch/cross-connect 240, where channels may be dropped from or added to lightwave 300 via optical fibers 254. Lightwave 300 then proceeds to second optical amplifier 250 via optical fiber 236 where it is amplified. The amplified lightwave 300 then proceeds over optical fiber 260 to POCE 10.

At this point, lightwave 300 almost certainly has a non-uniform channel power spectrum by virtue of the three main sources of channel non-uniformity, namely source non-uniformity, wavelength-dependent attenuation and wavelength-dependent amplification. However, POCE 10 acts to equalize the power in the N channels in the manner described in detail above, thereby forming an N channel lightwave 310 having a uniformized channel power spectrum.

Once the channel powers are equalized by POCE 10, the channel-equalized lightwave 310 travels over optical fiber 272 to demultiplexer 270, where the lightwave is demultiplexed into N different lightwaves 320A, 320B . . . 320N corresponding to the N channels. Lightwaves 320A, 320B, . . . 320N then travel over respective optical fibers 282A, 282B, . . . 282N and are received and detected by respective detectors 280A, 280B, . . . 280N. Detectors 280A, 280B, . . . 280N are adapted to generate corresponding electrical signals 284A, 284B, . . . 284N in response to detecting light from the N channels. The electrical signals are then available to be electronically processed.

An advantage of network 200 is that it does not require any VOAs or DGEFs to accomplish channel power equalization. Rather, the functions of the VOAs and the DGEFs are accomplished entirely by POCE 10. This leads to a simplified and less-costly multichannel optical network as compared to prior art optical multichannel optical networks.

The various elements depicted in the drawings are merely representational and are not drawn to scale. Certain proportions thereof may be exaggerated, while others may be minimized. The drawings are intended to illustrate various implementations of the invention, which can be understood and appropriately carried out by those of ordinary skill in the art.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. An apparatus comprising:
   first and second waveguides arranged to form a Mach-Zehnder interferometer (MZI); and
   a non-linear optical (NLO) medium section formed in the first waveguide to perform self-phase modulation of channels of an input multichannel lightwave traveling in the first waveguide, the MZI to passively produce a multichannel output lightwave having reduced channel power non-uniformity as compared to the input multichannel lightwave.

2. The apparatus of claim 1, wherein the NLO medium section includes a polymer.

3. The apparatus of claim 2, wherein the polymer includes polydiacetylene-para-toluene-sulfonate (PDA-PTS).

4. The apparatus of claim 1, wherein the NLO medium section includes at least one NLO medium selected from the group of NLO media comprising polydiacetylene-para-toluene-sulfonate (PDA-PTS), polydiacetylene-4-butylcarboxymethylurethane (PDA-BCMU), polythiophene, polycarbonate, polyphenylene vinylene, and polypyrrole.

5. The apparatus of claim 1, wherein the first and second waveguides are formed on a substrate.

6. The apparatus of claim 1, wherein the first and second waveguides comprise optical fibers.

7. An apparatus comprising:
   first and second waveguides arranged to form a Mach-Zehnder interferometer (MZI) having a central section;
   a non-linear optical (NLO) medium formed in one of the first and second waveguides in the central section to impart an intensity-dependent phase change to an N-channel lightwave traveling through the NLO medium so as to passively reduce channel power non-uniformity in the N-channel lightwave.

8. The apparatus of claim 7, wherein the NLO medium includes one of polydiacetylene-para-toluene-sulfonate (PDA-PTS), polydiacetylene-4-butylcarboxymethylurethane (PDA-BCMU), polythiophene, polycarbonate, polyphenylene vinylene, and polypyrrole.

9. The apparatus of claim 7, wherein the first and second waveguides comprise optical fibers.

10. A system including:
   a plurality (N) of light sources to emit light at N different wavelengths corresponding to N channels;
   a multiplexer optically coupled to the N light sources to multiplex the N channels into a multiplexed lightwave;
   a first optical amplifier optically coupled to the multiplexer to amplify each channel in the multiplexed lightwave;
   a passive optical channel equalizer (POCE) having first and second arms, with a non-linear optical (NLO) medium in at least one of the first and second arms to induce an intensity-dependent phase change in each of the N channels to reduce channel power non-uniformity in the multiplexed lightwave.

11. The system of claim 10, further including:
a demultiplexer coupled to the POCE to demultiplex the N channels in the multiplexed lightwave.

12. The system of claim 11, further including N detectors coupled to the demultiplexer to detect the N channels and generate N corresponding electrical signals.

13. The system of claim 11, wherein the N detectors include PIN photodetectors.

14. The system of claim 11, further including an optical switch or cross-connect optically coupled to the first amplifier.

15. The system of claim 14, further including a second optical amplifier optically coupled to the optical switch or cross-connect and the POCE.

16. The system of claim 10, wherein the NLO medium includes at least one of polydiacetylene-para-toluene-sulfonate (PDA-PTS), polydiacetylene-4-butylcarboxymethylurethane (PDA-BCMU), polythiophene, polycarbonate, polyphenylene vinylene, and polypyrrole.

17. The system of claim 10, wherein the system does not include a variable optical attenuator.

18. The system of claim 10, wherein the system does not include a dynamic gain equalization filter (DGEF).

19. A method comprising:
inputting a first multiplexed lightwave having N channels into a first waveguide;
forming a second multiplexed lightwave with the N channels in a second waveguide from the first multiplexed lightwave by passing the first multiplexed lightwave through a first coupling section of a Mach-Zehnder interferometer (MZI);
passing the first multiplexed lightwave through a non-linear optical (NLO) medium in the first waveguide to induce a phase change in each of the N channels relative to the N channels in the second multiplexed lightwave; and
interfering the first multiplexed lightwave with the second multiplexed lightwave at a second coupling section of the MZI to produce a multiplexed output lightwave having a reduce channel power non-uniformity compared to that of the inputted first multiplexed lightwave.

20. The method of claim 19, including outputting the output lightwave from the second waveguide.

21. The method of claim 19, including forming the NLO medium from at least one of polydiacetylene-para-toluene-sulfonate (PDA-PTS), polydiacetylene-4-butylcarboxymethylurethane (PDA-BCMU), polythiophene, polycarbonate, polyphenylene vinylene, and polypyrrole.

22. The method of claim 19, including forming the first and second waveguides form optical fibers.

23. A method comprising:
generating a plurality (N) of guided lightwaves at N different wavelengths thereby forming first N channel lightwaves; multiplexing the first N channel lightwaves into a guided multiplexed N channel lightwave; and
forming a channel-power-uniformized lightwave by passing the multiplexed N channel lightwave through a passive optical channel equalizer (POCE) having a waveguide with a non-linear optical (NLO) medium formed therein to induce an intensity-dependent phase change in each of the N channel lightwaves to reduce channel power non-uniformity in the multiplexed N channel lightwave.

24. The method of claim 23, further including amplifying the multiplexed N channel lightwave prior to passing the multiplexed N channel lightwave through the POCE.

25. The method of claim 24, further including demultiplexing the channel-power-uniformized lightwave to form second N channel lightwaves.

26. The method of claim 25, further including detecting each of the second N channel lightwaves and generating N corresponding electrical signals in response thereto.

27. The method of claim 23, further including forming the first and second waveguide from respective first and second optical fibers.

28. The method of claim 23, further including forming the NLO medium from at least one of polydiacetylene-para-toluene-sulfonate (PDA-PTS), polydiacetylene-4-butylcarboxymethylurethane (PDA-BCMU), polythiophene, polycarbonate, polyphenylene vinylene, and polypyrrole.

* * * * *

UNITED STATES PATENT AND TRADEMARK OFFICE
CERTIFICATE OF CORRECTION

PATENT NO. : 6,836,604 B2
APPLICATION NO. : 10/184591
DATED : December 28, 2004
INVENTOR(S) : Bhowmik It is certified that error appears in the above-identified patent and that said Letters Patent is hereby corrected as shown below:

In column 7, line 42, in Claim 19, delete "reduce" and insert - - reduced - -, therefor.

In column 8, line 10, in Claim 22, delete "form" and insert - - from - -, therefor.

Signed and Sealed this

Eighth Day of August, 2006

JON W. DUDAS
*Director of the United States Patent and Trademark Office*